United States Patent [19]

Mülhaupt et al.

[11] Patent Number: 5,244,948
[45] Date of Patent: Sep. 14, 1993

[54] PROCESS FOR THE STABILIZATION OF POLYOLEFINS

[75] Inventors: Rolf Mülhaupt, Marly; Jean Rody, Riehen; Mario Slongo, Tafers, all of Switzerland

[73] Assignee: Ciba-Geigy Corporation, Ardsley, N.Y.

[21] Appl. No.: 881,322

[22] Filed: May 7, 1992

Related U.S. Application Data

[63] Continuation of Ser. No. 704,661, May 20, 1991, abandoned, which is a continuation of Ser. No. 560,248, Jul. 27, 1990, abandoned, which is a continuation of Ser. No. 371,462, Jun. 26, 1989, abandoned.

[30] Foreign Application Priority Data

Jun. 30, 1988 [CH] Switzerland ................. 2502/88

[51] Int. Cl.$^5$ ............................................. C08K 5/34
[52] U.S. Cl. .................................. 524/99; 524/100; 524/102; 524/147
[58] Field of Search ................. 524/99, 100, 102, 147

[56] References Cited

U.S. PATENT DOCUMENTS

| | | | |
|---|---|---|---|
| 3,925,376 | 12/1975 | Chalmers et al. | 524/100 |
| 4,108,829 | 8/1978 | Cassandrini et al. | 544/209 |
| 4,111,835 | 9/1978 | Foschini et al. | 252/441 |
| 4,816,507 | 3/1989 | Cantatore et al. | 524/100 |

FOREIGN PATENT DOCUMENTS

| | | |
|---|---|---|
| 0045977 | 2/1982 | European Pat. Off. |
| 0107615 | 5/1984 | European Pat. Off. |
| 0192987 | 9/1986 | European Pat. Off. |
| 0254348 | 1/1988 | European Pat. Off. |
| 0299925 | 1/1989 | European Pat. Off. |
| 3809628 | 10/1988 | Fed. Rep. of Germany. |

OTHER PUBLICATIONS

C.A. 105, 134505p (1986).

Primary Examiner—Kriellion S. Morgan
Attorney, Agent, or Firm—Luther A. R. Hall

[57] ABSTRACT

Polyolefins and olefin copolymers which are prepared by polymerization on a catalyst made from a magnesium halide, a titanium compound and an aluminium alkyl can be stabilized by the addition of certain sterically hindered triazinylpiperidines, which are substituted in the 1-position, to the polymerization.

18 Claims, No Drawings

PROCESS FOR THE STABILIZATION OF POLYOLEFINS

This is a continuation of application Ser. No. 07/704,661, filed on May 20, 1991, now abandoned, which is a continuation of application Ser. No. 07/560,248, filed on Jul. 27, 1990, now abandoned, which is a continuation of application Ser. No. 07/371,462, filed on Jun. 26, 1989, now abandoned.

The invention relates to a process for the stabilization of polyolefins and olefin copolymers by the addition of certain stabilizers to the polymerization, the polymerization occurring by a certain process. The invention also relates to the olefin polymers stabilized in this way.

The low pressure polymerization of olefins using organometallic complex catalysts (for example Ziegler-Natta catalysts) normally leads to a fine polymer powder, which has to be granulated in an extruder before the shaping processing. Stabilizers and other additives are added during this granulation.

Success has recently been achieved in preparing spherically granular polymers which no longer have to be granulated, but can be directly processed, by the use of solid supported catalysts. Spherical magnesium halides of a certain particle size, as, for example, described in US-A 4,111,835 have in particular proved suitable as supports for these solid catalysts. The anhydrous magnesium halide forms insoluble complexes with $TiCl_4$ and electron donors, which are then activated with aluminum alkyls. The stereospecificity and activity are enhanced by the co-use of electron donors, for example carboxylic acid esters or compounds with Si—O—C bonds, described for example in EP—A 45 977.

Furthermore it has recently been found (EP—A 192 987) that in this kind of olefin polymerization, stabilizers of the sterically hindered piperidine type can be added to the polymerization without the polymerization process thereby being impaired.

In this case neither the polymerization yield nor the quality of the polymer are reduced and a stabilization against thermal, oxidative and photochemical ageing is achieved which is at least equal to the effect in the case of subsequent addition of a stabilizer of this type to the finished polymer. The advantage is the saving of an operative procedure, namely mixing and granulation.

This stabilization process is described in EP-A 192 987 and a large number of compounds are described there which are suitable as stabilizers for this process, including also those sterically hindered piperidine derivatives which contain a s-triazine group in their molecule.

In further work in this area it has been found that certain piperidine derivatives which contain at least one s-triazine group in their molecule are particularly suitable for the stabilization of olefins by addition to the polymerization.

In detail, the invention relates to a process for the stabilization of polyolefins and olefin copolymers, which are prepared by low pressure polymerization on a solid catalyst, which is prepared by the reaction of an aluminium alkyl with a solid product of a magnesium dihalide in active form and a titanium compound, the stabilization being carried out by the addition of a sterically hindered piperidine derivative to the polymerization, wherein a piperidine derivative of the formula I is used,

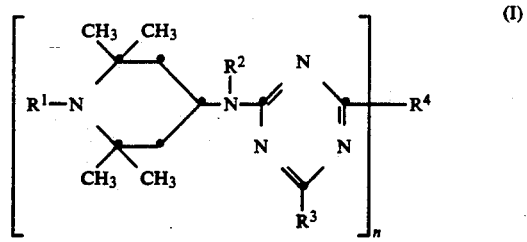

in which n is 1–4, $R^1$ is $C_1$–$C_4$allyl, benzyl or acetyl, and is also hydrogen in the case of n=2, $R^2$ is $C_1$–$C_{18}$alkyl, $C_5$–$C_{12}$cycloalkyl, $C_7$–$C_{12}$phenylalkyl, $C_3$–$C_{12}$alkyl interrupted by —O— or —N($R^6$)—, or is a group of the formula II,

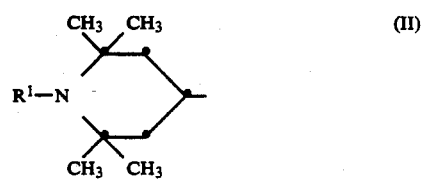

$R^3$ is a group

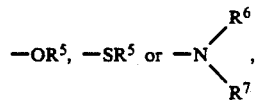

$R^4$ has one of the meanings given for $R^3$ when n=1, is one of the groups —X—$R^8$—Y—,

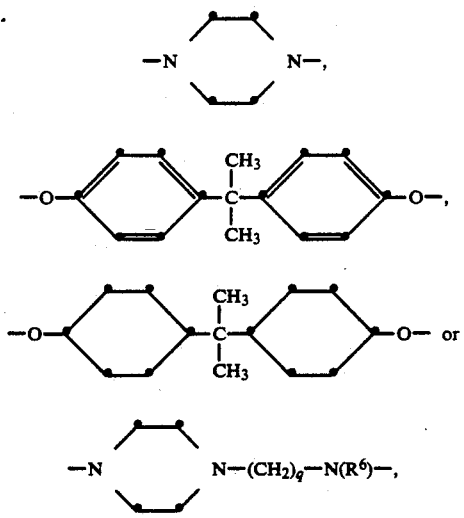

in which q is 2–6, when n=2, is one of the groups

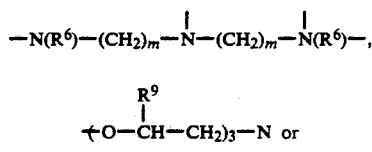

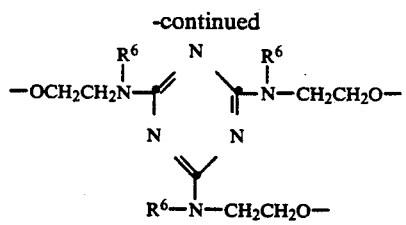

when n=3, and is a group

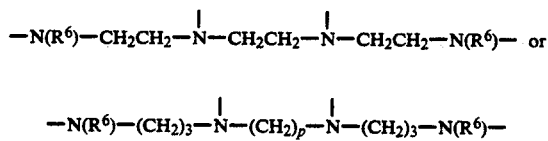

when n=4, $R^5$ is $C_1-C_{18}$alkyl, $C_3-C_{12}$alkenyl, $C_5-C_{12}$cycloakyl, $C_7-C_{12}$phenylalkyl, phenyl or phenyl substituted by $C_1-C_4$alkyl, $C_1-C_4$alkoxy or halogen, $R^6$ and $R^7$ are independently of one another hydrogen, $C_1-C_{18}$alkyl, $C_5-C_{12}$cycloalkyl, $C_7-C_{12}$phenylalkyl or a group of the formula II, or $R^6$ and $R^7$ are together $C_4-C_{10}$alkylene or $C_5-C_7$oxa- or azaalkylene, $R^8$ is $C_2-C_{12}$alkylene, $C_4-C_{12}$alkylene interrupted by —O— or —N($R^6$)—, $C_5-C_{12}$cycloalkylene or phenylene, $R^9$ is hydrogen or methyl, X and Y are independently of one another —O— or —N($R^6$)—, m is 2 or 3 and p is 2-10.

The radical $R^1$ as $C_1-C_4$ can, for example, be methyl, ethyl, propyl or butyl and preferably $R^1$ is methyl.

$R^2$, $R^5$, $R^6$ and $R^7$ as $C_1-C_{18}$alkyl may be an unbranched or branched alkyl. Examples thereof are methyl, ethyl, n-propyl, isopropyl, n-butyl, isobutyl, tert-butyl, n-pentyl, sec-pentyl, n-hexyl, 2-ethylbutyl, n-octyl, 2-ethylhexyl, n-decyl, isodecyl, n-dodecyl, 2,2,4,4-tetramethylbutyl, n-tetradecyl, n-hexadecyl or n-octadecyl. $R^2$ as alkyl interrupted by O or N($R^6$) may, for example, be 2-methoxyethyl, 2-ethoxyethyl, 2-butoxyethyl, 3-methoxypropyl, 2-dimethylaminoethyl or 3-diethylaminopropyl.

$R^2$, $R^5$, $R^6$ and $R^7$ as $C_5-C_{12}$cycloalkyl may, for example, be cyclopentyl, cyclohexyl, cyclooctyl or cyclododecyl. A radical of this type is preferably cyclohexyl.

$R^2$, $R^5$, $R^6$ and $R^7$ as $C_7-C_{12}$phenylalkyl may, for example, be benzyl, 2-phenylethyl, 1-phenylethyl or α,α-dimethylbenzyl. A radical of this type is preferably benzyl.

$R^5$ as $C_3-C_{12}$alkenyl may, for example, be allyl, methallyl, but-2-enyl, but-3-enyl, hex-2-enyl, hex-5-enyl, oct-7-enyl or dec-9-enyl. Compounds with unsaturated substituents of this type can copolymerize in the reaction medium.

$R^5$ as phenyl substituted with alkyl, alkoxy or halogen may, for example, be p-tolyl, m-tolyl, 4-tert-butylphenyl, 4-methoxyphenyl, 3-ethoxyphenyl or 4-chlorophenyl.

$R^8$ as $C_2-C_{12}$alkylene may be unbranched or branched alkylene. Examples thereof are di-, tri-, tetra-, hexa-, octa-, deca- and dodecamethylene, 1,2-propylene or 2,2-dimethyl-1,3-propylene. If the alkylene radical is interrupted by O or N($R^6$), this may, for example, be 3-oxapentamethylene, 4-oxaheptamethylene, 3,6-dioxaoctamethylene or 3-aza- or 3-methylazapentamethylene.

$R^8$ as cycloalkylene may in particular be cyclohexylene. When $R^6$ and $R^7$ together are alkylene, oxa- or azaalkylene, they form, together with the N atom to which they are bonded, a heterocyclic ring, for example a pyrrolidine, piperidine, hexamethyleneimino, morpholine or piperazine ring. These rings may be alkyl-substituted.

Those compounds of the formula I are preferably used in which n is 1–4, $R^1$ is $C_1-C_4$alkyl, and is also hydrogen in the case of n=2, $R^2$ is $C_1-C_{12}$alkyl, cyclohexyl, benzyl or a group of the formula II, $R^3$ is a group —$OR^5$ or —N($R^6$)($R^7$), $R^4$ has one of the meanings given for $R^3$ when n=1, is a group

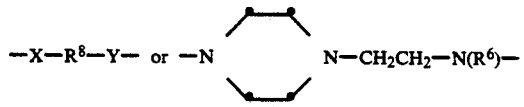

when n=2, is a group

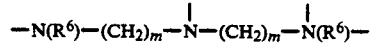

when n=3, and is a group

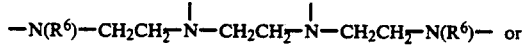

when n=4, $R^5$ is $C_1-C_{12}$alkyl, cyclohexyl, benzyl, phenyl or tolyl, $R^6$ is hydrogen, $C_1-C_{12}$alkyl, cyclohexyl, benzyl or a group of the formula II, $R^7$ is $C_1-C_{12}$alkyl, cyclohexyl or a group of the formula II or $R^6$ and $R^7$ are together tetramethylene, pentamethylene or 3-oxapentamethylene, $R^8$ is $C_2-C_{12}$alkylene, cyclohexylene or phenylene, X and Y are —O— or —N($R^6$)—, m is 2 or 3 and p is 2–6.

Preferably, $R^1$ is methyl and $R^2$ is $C_1-C_8$alkyl or a group of the formula II. Preferably $R^3$ is a group —N($R^6$)($R^7$). When n=1 in formula I, $R^4$ is preferably a group —N($R^6$)($R^7$). When n=2, X and Y are preferably a group —N($R^6$)— and $R^8$ is preferably $C_2-C_6$alkylene. When n=3 or 4, $R^6$ is preferably hydrogen or $C_1-C_4$alkyl, particularly methyl.

The compounds of the formula I are known compounds or can be prepared by analogy thereto. Compounds of this type are described for example in U.S. Pat. Nos. 3,925,376, 4,108,829, EP-A 107 615, DE-A 3 727 977, DE-A 3 809 628, EP-A 292 437, EP-A 299 925.

Examples of piperidine compounds which may be used according to the invention are the compounds of the following formulae:

1. 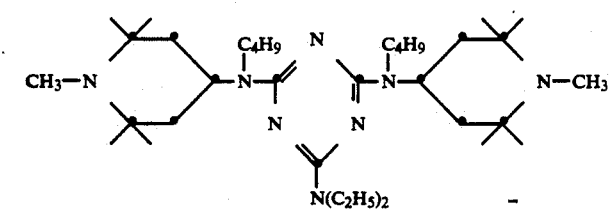
2. 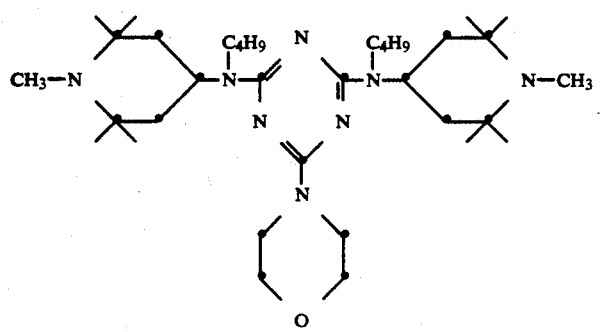
3. 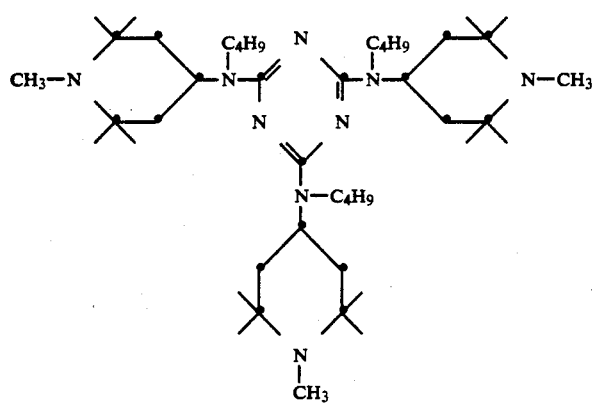
4. 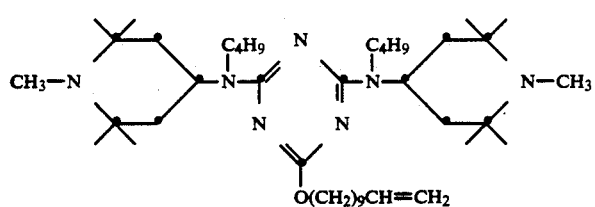
5. 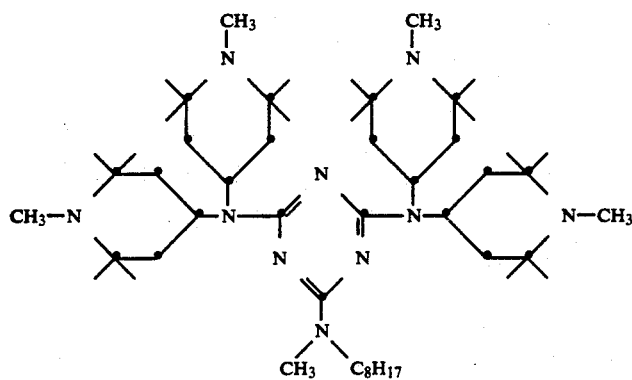

6.
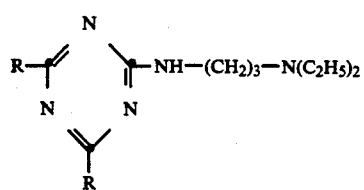 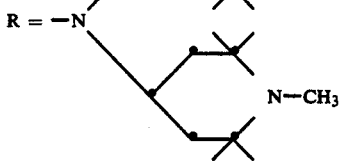
7.
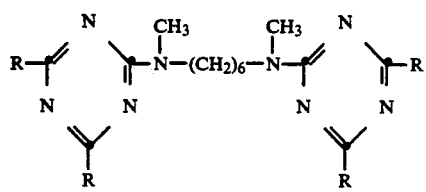
8.
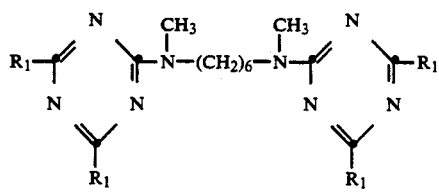
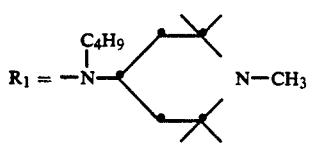
9.
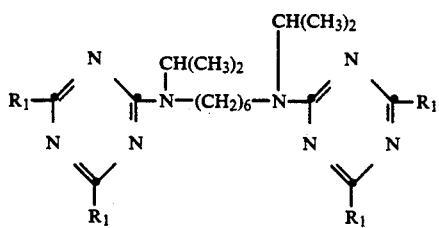
10.
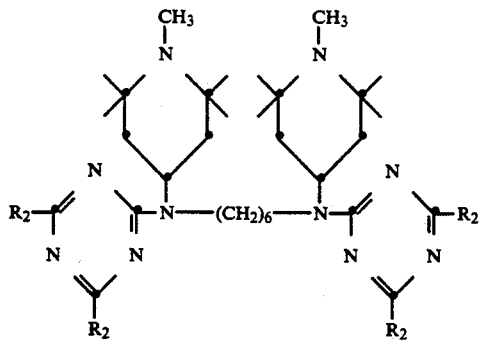
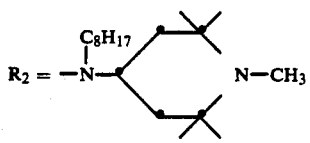

-continued
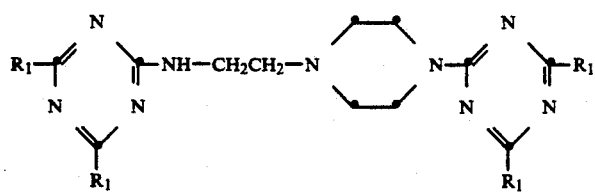
11.
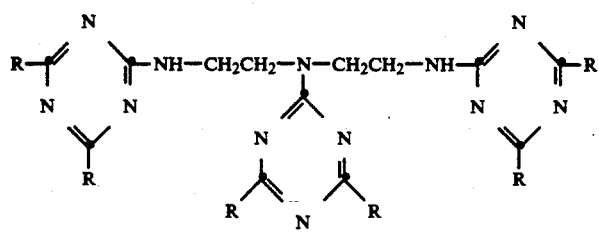
12.
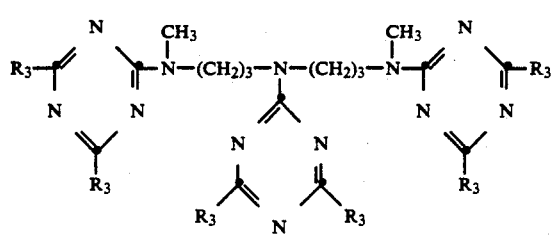
13.
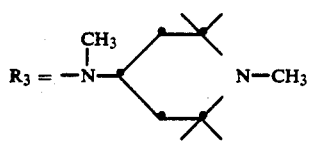
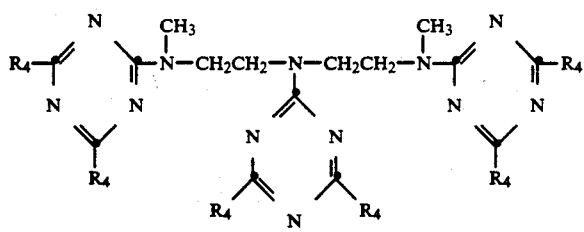
14.
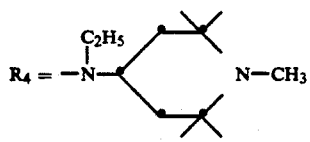
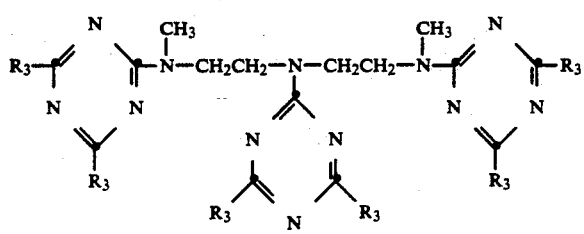
15.

-continued
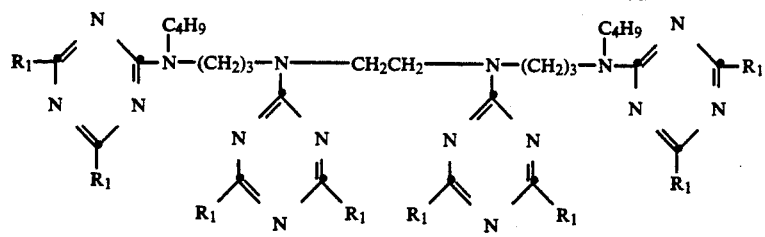
16.
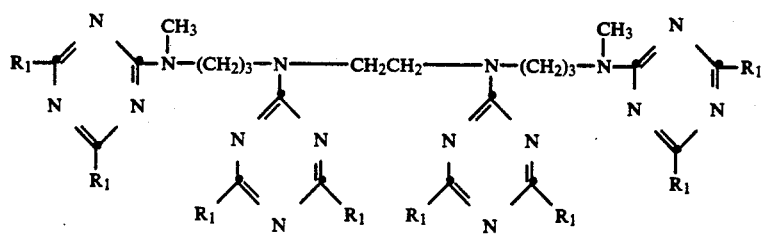
17.
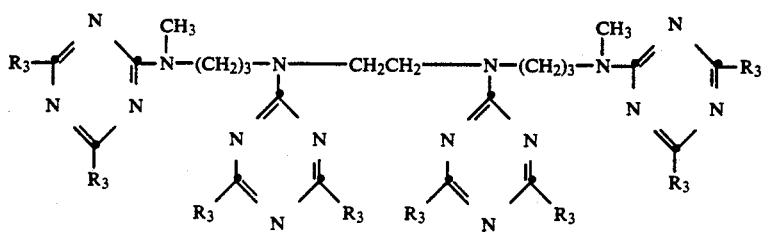
18.
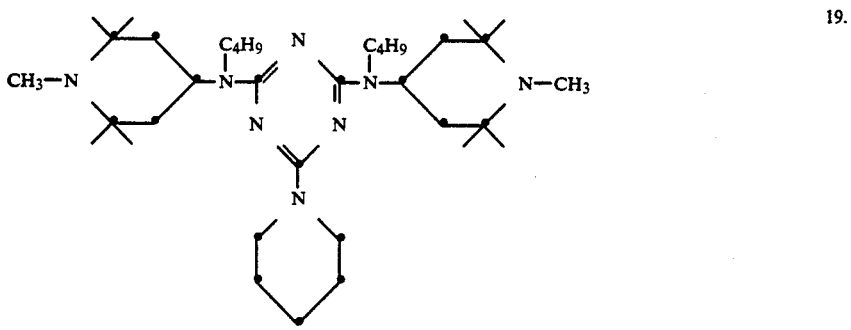
19.
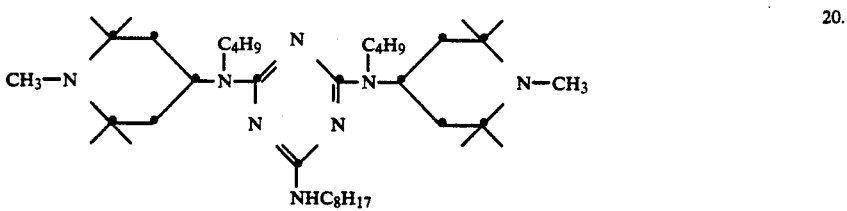
20.
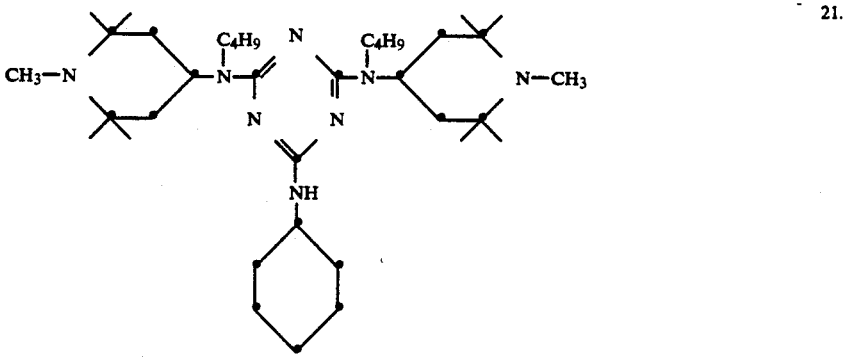
21.

-continued
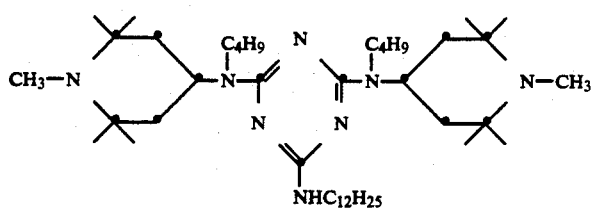
22.
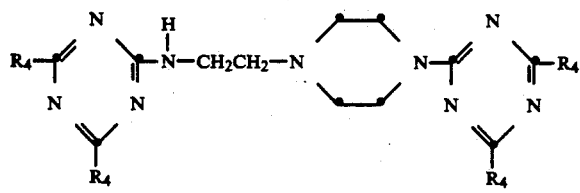
23.
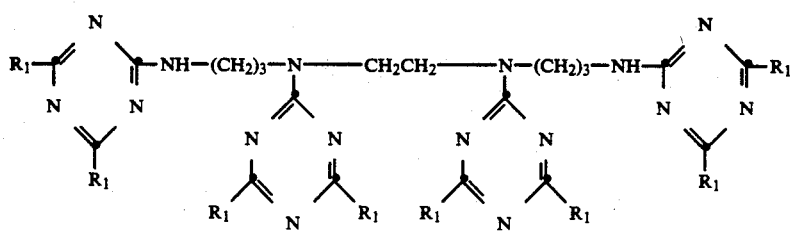
24.
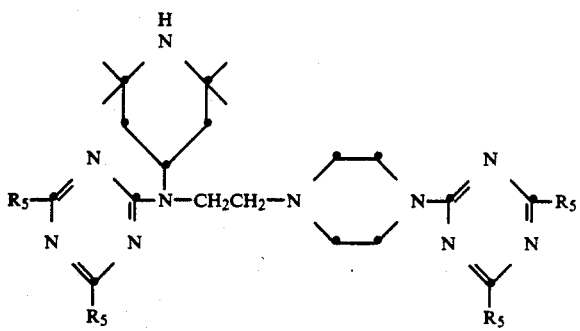
25.
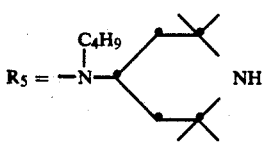
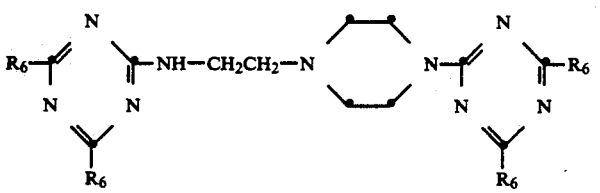
26.
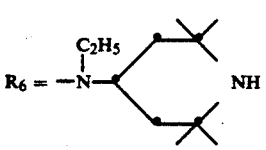
In the formulae 1–26,

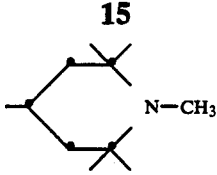

is a 1,2,2,6,6-pentamethylpiperidine radical.

The polymerization catalysts used are solid catalysts. They comprise an anhydrous magnesium dihalide in active form and a titanium compound. A magnesium dihalide in active form is to be understood as meaning a magnesium dihalide in whose X-ray spectrum the line of the strongest reflection is broadened in comparison with the corresponding line in the spectrum of the inactive magnesium halide.

The magnesium halide used is preferably magnesium dichloride or magnesium bromide. Preferably, spherical magnesium chloride is used. The titanium compound preferably contains at least one titanium-halogen bond, and titanium tetrachloride is particularly preferably used.

The titanium compound can be used in combination with an electron donor, for example a carboxylic acid ester, as described in EP-A 45 977.

After the reaction of the magnesium halide component with the titanium compound and, if desired, with the electron donor, the excess of titanium compound and the excess of electron donor are expediently washed out with an inert solvent, for example with hexane or heptane.

The catalyst prepared in this way is activated by reaction with an aluminiumalkyl, which is preferably used as a solution in an alkane. Examples of suitable aluminium alkyls are $Al(C_2H_5)_3$ or $Al(C_4H_9)_3$. Here, an electron donor can be added as coactivator, for example an organosilicon compound which contains at least one Si-O-C bond, as described for example in EP-A 45 977. Examples of silicon compounds of this type are phenyltriethoxysilane, phenyltrimethoxysilane, diphenyldimethoxysilane, methyltriethoxysilane, dimethyldiethoxysilane or ethyltrimethoxysilane.

The polymerization with these catalysts can be carried out in the liquid or gaseous phase. It is preferable to operate in the liquid phase, for example in alkanes or in the liquid monomer.

The stabilizer (piperidine compound) can be added at the beginning of the polymerization, during the polymerization or at the end of the polymerization. It is preferably added during the polymerization.

Vigorous stirring is expediently used to ensure as homogeneous a distribution as possible of the catalyst and of the stabilizer in the polymerization medium.

The quantity of piperidine stabilizer added is governed by the desired degree of stabilization. Generally 0.01 to 5% by weight, particularly 0.05 to 1% by weight, relative to the polymer are added. Apart from the piperidine stabilizer, other stabilizers may also be added during polymerization. Phosphorus(III) esters are particularly suitable as other stabilizers. These may be phosphites, phosphonites or phosphinites. They may contain one or more phosphorus ester groups. Preferably a triorganophosphite is added. Examples of phosphorus(III) esters of this type are: triphenyl phosphite, decyl diphenyl phosphite, phenyl didecyl phosphite, tris(nonylphenyl) phosphite, trilauryl phosphite, trioctadecyl phosphite distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, tristearyl sorbitol triphosphite, tetrakis(2,4-di-tert-butylphenyl)-4,4'-biphenylene diphosphonite, bis(2,6-di-tert-butyl-4-methylphenyl) pentaerythritol diphosphite.

Alternatively or in addition to the phosphorus(III) esters, other stabilizers or additives which do not impair the polymerization process may also be added, for example antioxidants of the sterically hindered phenol type.

The following compounds are examples of antioxidants of this type:

Alkyl-substituted monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol and 2,6-dinonyl-4-methylphenol.

Alkyl-substituted hydroquinones, for example 2,6-di-tert-butyl-4-methoxyphenol, 2,5-di-tert-butylhydroquinone, 2,5-di-tert-amylhydroquinone and 2,6-diphenyl-4-octadecyloxyphenol.

Hydroxyl-substituted thiodiphenyl ethers, for example 2,2'-thio-bis(6-'tert-butyl-4-methylphenol), 2,2'-thio-bis(4-octylphenol), 4,4'-thio-bis(6-tert-butyl-3-methylphenol) and 4,4'-thio-bis(6-tert-butyl-2-methylphenol).

Alkylidene-bisphenols, for example 2,2'-methylene-bis(6-tert-butyl-4-methylphenol), 2,2'-methylene-bis(6-tert-butyl-4-ethylphenol), 2,2'-methylene-bis[4-methyl-6-(α-methylcyclohexyl)phenol], 2,2'-methylene-bis(4-methyl-6-cyclohexylphenol), 2,2'-methylene-bis(6-nonyl-4-methylphenol), 2,2'-methylene-bis(4,6-di-tert-butylphenol), 2,2'-ethylidene-bis(4,6-di-tert-butylphenol), 2,2'-ethylidene-bis(6-tert-butyl-4-isobutylyphenol), 2,2'-methylene-bis[6-(α-methylbenzyl)-4-nonylphenol], 2,2'-methylene-bis[6-(α,α-dimethylbenzyl)-4-nonylphenol], 4,4'-methylene-bis(2,6-di-tert-butylphenol), 4,4'-methylene-bis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis [3,3-bis(3'-tert-butyl-4'-hydroxyphenyl) butyrate], bis(3-tert-butyl-4-hydroxy-5-methylphenyl)dicyclopentadiene and bis[2-(3'-tert-butyl-2'-hydroxy-5'-methylbenzyl)-6-tert-butyl-4-methylphenyl] terephthalate.

Benzyl compounds, for example 1,3,5-tris-(3,5-di-tert-butyl-4-hydroxybenzyl)-2,4,6-trimethylbenzene, bis(3,5-di-tert-butyl-4-hydroxybenzyl) sulfide, isooctyl 3,5-di-tert-butyl-4-hydroxybenzylmercaptoacetate, bis(4-tert-butyl-3-hydroxy-2,6-dimethylbenzyl)dithiol terephahtlate, 1,3,5-tris(3,5-di-tert-butyl-4-hydroxybenzyl) isocyanurate, 1,3,5-tris(4-tert-butyl-3-hydroxy-2,6-dimethylbenzyl) isocyanurate, dioctadecyl 3,5-di-tert-butyl-4-hydroxybenzylphosphonate, the Ca salt of monoethyl 3,5-di-tert-butyl-4-hydroxybenzylphosphonate and 1,3,5-tris(3,5-dicyclohexyl-4-hydroxybenzyl) isocyanurate.

Acylaminophenols, for example 4-hydroxylauranilide, 4-hydroxystearanilide, 2,4-bis(octylmercapto)-6-(3,5-di-tert-butyl-4-hydroxyanilino)-s-triazine and octyl N-(3,5-di-tert-butyl-4-hydroxyphenyl)carbamate.

Esters of β-(3,5-di-tert-butyl-4-hydroxyphenyl)-propionic acid with monohydric or polyhydric alcohols, for example with methanol, octadecanol, 1,6-hexanediol, neopentyl glycol, thiodiethylene glycol, diethylene glycol, triethylene glycol, pentaerythritol, tri(hydroxyethyl) isocyanurate or N,N'-bis(hydroxyethyl)oxalamide.

Esters of β-(5-tert-butyl-4-hydroxy-3-methylphenyl)-propionic acid with monohydric or polyhydric alcohols, for example with methanol, octadecanol, 1,6-hexanediol, neopentyl glycol, thiodiethylene glycol, diethylene glycol, triethylene glycol, pentaerythritol, tris(-hydroxy)ethyl isocyanurate or N,N'-bis(hydroxyethyl)oxalamide.

Esters of β-(3,5-dicyclohexyl-4-hydroxyphenyl)-propionic acid with monohydric or polyhydric alcohols, for example with methanol, octadecanol, 1,6-hexanediol, neopentyl glycol, thiodiethylene glcyol, diethylene glycol, triethylene glycol, pentaerythritol, tris(-hydroxy)ethyl isocyanurate or N,N'-bis(hydroxyethyl)oxalamide.

Amides of β-(3,5-di-tert-butyl-4-hydroxyphenyl)-propionic acid, for example N,N'-bis(3,5-di-tert-butyl-4-hydroxyphenylpropionyl)hexamethylenediamine, N,N'-bis(3,5-di-tert-butyl-4-hydroxyphenylpropionyl)-trimethylenediamine and N,N'-bis(3,5-di-tert-butyl-4-hydroxyphenylpropionyl)hydrazine.

The amount of phosphorus(III) ester or other stabilizers is governed by the amount of piperidine compound added. Generally 0.01 to 1% by weight, particularly 0.05 to 0.5% by weight, is used relative to the polymer.

The process according to the invention relates to the addition of stabilizers to the polymerization or copolymerization of olefins. The olefins may be ethylene or α-olefins. Examples of an α-olefin are propylene, 1-butene, 1-pentene, 3-methyl-1-butene, 4-methyl-1-pentene or 5-methylene-1-hexene. For copolymerization, mixtures of olefins with one another can be used, or mixtures of olefins with other ethylenically unsaturated compounds, for example with vinyl acetate, vinyl chloride or alkyl acrylates. The process is of particular interest for the polymerization of propylene.

the invention also relates to the polymers or copolymers of olefins which have been stabilized according to the invention, particularly a polypropylene stabilized in this way.

The following examples illustrate the process in more detail without limiting it to the scope of the examples. Parts and percentages therein are by weight, unless stated otherwise.

EXAMPLE 1

Polymerization of propylene

The polymerization is carried out in a thermostatically controlled 4-liter stainless steel autoclave, equipped with a stirrer, which is dried before the beginning of the polymerization by purging for one hour with propylene gas at 70° C. The preparation of the solid catalyst component made from spherical MgCl$_2$ and TiCl$_4$ is carried out as described in Example 1 U.S. Pat. No. 4,111,835. It contains 2.9% of Ti and 19 of Mg. 10 mg of this catalyst are suspended in 25 ml of n-hexane and a mixture of 685 mg of triethylaluminium, 80 mg of phenyltriethoxysilane and 200 ml of hexane is added. This catalyst suspension is transferred under propylene gas to the autoclave. After closing the autoclave 1.25 l of highly pure hydrogen are injected and finally 1.2 kg of liquid propylene are added under pressure. The contents are heated to 70° C. with stirring (500 rpm) and kept at this temperature for 2 hours. Then the excess of propylene is released and the polymer obtained is treated with steam at 100° C. for 10 minutes and subsequently dried at 50° C. for 8 hours. The polymer consists of spherical particles. The following investigations of the polymer are carried out.

The catalyst activity (g of polymer/g of catalyst) is calculated from the Mg content determined by atomic absorption and from the polymer yield. The isotacticity is determined as the percentage proportion of the polymer which is insoluble in hot xylene. For this purpose the polymer is dissolved in hot xylene and after cooling the insoluble portion is filtered off and dried to constant weight.

The polymer morphology is qualitatively assessed visually, in order to determine whether agglomerations have occurred.

The colour of the polymer is characterized by the Yellowness Index in accordance with ASTM D 1925-70.

As an indirect measure of the molecular weight, the intrinsic viscosity [η] in tetrachloroethylene at 135° C. is determined as well as the melt flow index in accordance with ASTM D 1238 at 230° C./2160 g.

The stability to oxidative degradation is determined from the time which elapses until there is a discernible embrittlement of the polymer during oven ageing at elevated temperature. This test is carried out on sheets, which are produced by press moulding at 220° C.

The following values resulted for the unstabilized polypropylene described above:

| | |
|---|---|
| Catalyst activity | 45.5 kg |
| Isotacticity | 97.0% |
| Intrinsic viscosity | 1.8 dl/g |
| Morphology | spherical |
| Melt flow index | 15 g/10 min |
| Yellowness Index | 4.5 |
| Oven ageing of sheets | at 135° C.: 0.75 h |
| | at 150° C.: 0.50 h |

EXAMPLE 2

Stabilization

The procedure described in Example 1 is repeated. About 10 minutes after the beginning of the polymerization a solution of 0.45 g of the stabilizer (piperidine compound) given in Table 1 in 50 ml of hexane is added to the autoclave. Polymerization, working-up and characterization of the polymer are carried out as in Example 1. The characteristic values obtained are listed in Table 1.

TABLE 1

| | Stabiliser (Comp. no.) | | | | |
|---|---|---|---|---|---|
| | 1 | 2 | 4 | 8 | 9 |
| Catalyst activity (kg/g) | 45,5 | 43 | 41,8 | 40 | 43 |
| Isotacticity (%) | 97.1 | 97.1 | 96.8 | 96.9 | 97.0 |
| Intrinsic viscosity (dl/g) | 1.9 | 1.8 | 2.0 | 1.8 | 1.84 |
| Morphology | +*) | + | + | + | + |
| Melt flow index (g/10 min) | 6.6 | 9.0 | 6.0 | 6.3 | 13.3 |
| Yellowness Index | 2.2 | 1.9 | 2.4 | 2.5 | 2.2 |
| Oven ageing (h) | | | | | |
| at 135° C. | >700 | >700 | 700 | >700 | 860 |
| at 150° C. | 180 | 325 | 370 | 320 | 250 |

TABLE 1-continued

| | Stabiliser (Comp. no.) | | | | |
|---|---|---|---|---|---|
| | 10 | 11 | 13 | 14 | 15 |
| Catalyst activity (kg/g) | 45.5 | 45.5 | 45.5 | 45.5 | 40.9 |
| Isotacticity (%) | 97.1 | 97.2 | 97.0 | 96.9 | 97.0 |
| Intrinsic viscosity (dl/g) | 1.56 | 1.55 | 1.55 | 1.73 | 1.54 |
| Morphology | + | + | +*) | + | + |
| Melt flow index (g/10 min) | 15.3 | 14.2 | 16.7 | 13.8 | 14.2 |
| Yellowness Index | 2.4 | 2.3 | 2.8 | 2.6 | 4.4 |
| Oven ageing (h) | | | | | |
| at 135° C. | 900 | 860 | 410 | 458 | 220 |
| at 150° C. | 55 | 240 | 25 | 250 | 70 |

| | Stabiliser (Comp. no.) | | | | |
|---|---|---|---|---|---|
| | 17 | 18 | 19 | 20 | 21 |
| Catalyst activity (kg/g) | 45.5 | 45.5 | 43.2 | 45.5 | 45.5 |
| Isotacticity (%) | 97.0 | 97.0 | 97 | 97 | 97 |
| Intrinsic viscosity (dl/g) | 1.90 | 1.75 | | | |
| Morphology | + | + | + | + | + |
| Melt flow index (g/10 min) | 8.1 | 12.6 | 5.8 | 5.4 | 7.3 |
| Yellowness Index | 2.8 | 2.4 | 3.2 | 3.4 | 3.3 |
| Oven ageing (h) | | | | | |
| at 135° C. | 700 | 860 | | | |
| at 150° C. | 370 | 119 | 288 | 216 | 408 |

| | Stabiliser (Comp. No.) | | | |
|---|---|---|---|---|
| | 22 | 23 | 24 | 25 |
| Catalyst activity (kg/g) | 43 | 43.2 | 45.5 | 44.1 |
| Isotacticity (%) | 97 | 97 | 92.2 | 97 |
| Morphology | + | + | + | + |
| Melt flow index (g/10 min) | 8.4 | 6.2 | 14.2 | 2.8 |
| Yellowness Index | 3.4 | 3.2 | 4.0 | 3.7 |
| Oven ageing (h) | | | | |
| at 150° C. | 400 | 410 | 240 | 400 |

*)+ = as in Example 1

EXAMPLE 3

The procedure described in Example 1 is repeated. One hour after the beginning of the polymerization a solution of 0.21 g of compound No. 3 in 50 ml of hexane is added to the polymerization mixture. Working-up and characterization are carried out as in Example 1.

The following values were obtained:

| | |
|---|---|
| Catalyst activity | 45.5 kg |
| Isotacticity | 97.0% |
| Intrinsic viscosity | 1.9 dl/g |
| Morphology | as in Example 1 |
| Melt flow index | 7.4 (g/10 min) |
| Yellowness Index | 4.2 |
| Oven ageing of sheets | at 135° C.: >100 h |
| | at 150° C.: 144 h |

What is claimed is:

1. A process for the stabilization of a polyolefin and olefin copolymer, which is prepared by low pressure polymerization on a solid catalyst, which is prepared by the reaction of an aluminium alkyl with a solid product of a magnesium dihalide in active form and a titanium compound, the stabilization being carried out by the addition of a sterically hindered piperidine derivative to the polymerization, wherein a piperidine derivative of formula I is used,

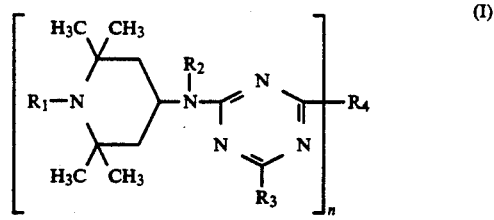

in which n is 1–4,
R₁ is methyl,
R₂ is C₁–C₁₈alkyl, or is a group of formula II

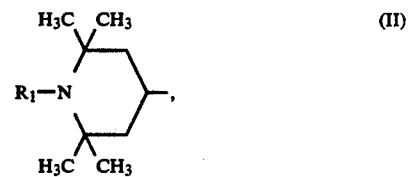

R₃ is a group

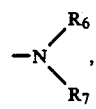

R₄ has one of the meanings given for R₃ when n=1, or is one of the groups —X—R₈—Y—,

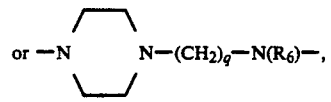

in which q is 2–6, when n=2, or is the group

when n=3, or is a group

when n=4,
R₆ and R₇ are independently of one another hydrogen, C₁–C₁₈alkyl, C₅–C₁₂cycloalkyl, C₇–C₁₂phenylalkyl or a group of the formula II, or R₆ and R₇ are together C₄–C₁₀alkylene or C₅–C₇oxaalkylene,
R₈ is C₂–C₁₂alkylene,
X and Y are —N(R₆)—,
m is 2 or 3, and
p is 2–10.

2. A process according to claim 1 wherein in formula I, R₂ is C₁–C₈alkyl or a group of the formula II.

3. A process according to claim 1 wherein in formula I, R₃ is a group N(R₆)(R₇).

4. A process according to claim 1 wherein in formula I, n=1 and R₄ is a group N(R₆)(R₇).

5. A process according to claim 1 wherein in formula I, n=2, X and Y are a group N(R₆)- and R₈ is C₂–C₆alkylene.

6. A process according to claim 1 wherein in formula I, n=2 and R₄ is a group

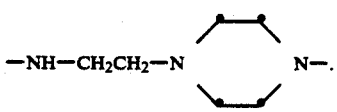

7. A process according to claim 1 wherein in formula I, n=3 or 4 and $R_6$ is hydrogen or $C_1$-$C_4$alkyl.

8. A process according to claim 1 wherein the catalyst is prepared from spherical magnesium chloride.

9. A process according to claim 1 wherein titanium tetrachloride is used as titanium compound in the preparation of the catalyst.

10. A process according to claim 1 wherein the catalyst is activated by the addition of an electron donor.

11. A process according to claim 10 wherein an organosilicon compound having at least one Si—O—C bond is used as electron donor.

12. A process according to claim 1 wherein, apart from the sterically hindered piperidine compound, a phosphorus(III) ester is added to the polymerization.

13. A process according to claim 12 wherein a triorganophosphite is added.

14. A process according to claim 1 wherein the process is used for the polymerization of propylene.

15. A polymer stabilized by the process of claim 1.

16. A polypropylene stabilized by the process of claim 1.

17. A process according to claim 1 wherein an antioxidant of the sterically hindered phenol type is additionally added to the polymerization.

18. A process according to claim 12 wherein an antioxidant of the sterically hindered phenol type is additionally added to the polymerization.

* * * * *